United States Patent Office 3,048,489
Patented Aug. 7, 1962

3,048,489
BREWING PROCESS
Peter Blum, Chicago, Ill., assignor, by mesne assignments, to Falstaff Brewing Corporation, a corporation of Delaware
No Drawing. Filed Apr. 22, 1960, Ser. No. 23,913
5 Claims. (Cl. 99—51)

This invention relates to a process for producing a boiled malt wort.

In the production of beer, it is necessary to first produce a boiled wort. The resulting boiled wort is treated with hops and then cooled and fermented to make beer. Boiled wort may also be used in the manufacture of malt extract and malt syrup.

In the conventional brewing process, an adjunct mash is first prepared by boiling a suitable starch source such as brewer's corn or rice grits in a deep closed vessel (cooker). These adjuncts are boiled with a small portion of malt to achieve liquefaction of the starch. In certain cases, the cooker mash may be omitted, as for example, in the usual European practice.

While the cooker mash is boiling, the main portion of malt grist is mixed with water in a large vessel (mash tub) and heated gently to achieve some degradation of malt proteins. The cooker mash is then added, the temperature raised, and conversion of starch to carbohydrates of lower molecular weight takes place.

If the mash tub is equipped with a false bottom, the liquid is now filtered, or the entire mash is transferred to a special wide vessel for filtration (lauter tub). In the lauter tub, the liquid is recycled until a firm filter bed of malt grains has been established, and a clear liquid (wort) can be produced by filtering.

Instead of lautering, filtration may be done with specially designed filter presses (mash filters).

The remaining grains are frequently sprayed with hot water (sparging) to obtain further soluble material.

This clear liquid wort can be used to make malt syrup or further processed to make beer. For the production of beer, the filtered liquid and spargings are placed in a deep vessel (brew kettle) wherein they are raised to the boiling point. During boiling for 1 to 2½ hours, hops are added and the resulting boiled mixture, now referred to as boiled wort, is cooled and fermented to produce beer.

This process has several disadvantages. The filtration is a lengthy and cumbersome operation. In order to obtain maximum yield, extensive sparging is required which dilutes the wort. The excess water thus introduced must be removed during boiling, thus prolonging an already extended process.

Another disadvantage is the maintenance of two or three separate vessels, for mashing, lautering, and kettle boiling, and the need to transfer the mash or wort.

Yet a further disadvantage is the large volume of spent grains which generally have to be dried or sold at a discount if not dried, before a market can be found for this by-product.

It is therefore an object of this invention to provide a process for producing boiled wort from malt flour which eliminates the undesirable features of the process set forth above.

It is a further object of this invention to provide a process which decreases the time for producing a boiled wort.

It is another object of this invention to provide a process for producing a boiled wort from malt flour which extracts the maximum solubles in a minimum time.

It is still another object of this invention to provide a process of producing a boiled wort from malt flour which permits the mashing and boiling operations to be carried out in the same vessel.

It is still a further object of this invention to provide a process of producing a boiled malt wort from malt flour which produces maximum filtration efficiency by reducing the time required for filtration, and by increasing the ability of the sparge water to remove soluble material from the spent grain.

It is a still further object of this invention to provide a process for producing a boiled wort from malt flour which comprises the steps of preparing a malt mash containing a finely ground malt flour, and boiling the malt mash.

Other objects and advantages of the invention will become apparent from the following description.

The desirable advantages of the process of this invention can be achieved by using a malt flour and by placing the filtration step after the boiling operation instead of between the mashing and boiling cycle. This will also permit these operations to be carried out in a single reaction vessel.

In order to achieve filtration after boiling, the malt must be ground fine enough so that complete conversion takes place during the mashing cycle. Otherwise unexposed starch granules will be liberated during boiling, and will later interfere with fermentation and beer clarity. Malt flours ground fine enough to pass through a 60 mesh screen have been found satisfactory for this purpose; however, for optimum results a flour which will pass through a 100 mesh screen is preferred. Of course, more finely ground malt flour may also be used.

The yield of the mashing process is a direct function of the fineness of grind, up to a maximum, but filtration difficulties limit the particle size of malt grist in the conventional process. However, by boiling a mash made from finely ground malt flour, the normal coagulation of malt proteins makes it possible to use standard mash filters or other filtration equipment, and improves the filtration rate. Contrary to prior practice, in which only the clear filtrate is boiled, no attempt is made in this process to remove insolubles until after boiling.

The difference in filtration rate between an unboiled grist mash and a flour mash is illustrated in Table I. In preparing the mashes from which the figures in the tables have been derived, the mashes were prepared in accordance with the method prescribed by The American Society of Brewing Chemists. Both mashes were prepared in duplicate, and one pair of each grind was boiled for one-half hour prior to filtration. The standard process and the boiled flour process have also been compared at more concentrated slurries (Table II). The data clearly indicates a basic difference in filtration rates between unboiled and boiled mashes, in favor of filtration of a flour mash after boiling.

Table I

| Malt/Water Ratio | Type of Grind | Process | Filtration, Minutes | Filtrate, ml. | Extract, Percent |
|---|---|---|---|---|---|
| 1:8 | Grist | unboiled | 85 | 340 | 77.3 |
|  | do | boiled | [1] 120 | [1] 305 | 78.3 |
|  | Flour | unboiled | 50 | 345 | 80.5 |
|  | do | boiled | 25 | 338 | 80.3 |

[1] Contains starch granules which interfere with filtration, and reduce yield.

The same advantage can be shown at other malt to water ratios.

Table II

| Malt/Water Ratio | Type of Grind | Process | Filtration, Minutes | Filtrate, ml. |
|---|---|---|---|---|
| 1:6 | Grist | unboiled | 85 | 205 |
|  | Flour | boiled | 25 | 325 |
| 1:3 | Grist | unboiled | (¹) | 85 |
|  | Flour | boiled | 65 | 225 |

¹ Incomplete.

A further advantage of filtering after boiling is in greater speed and efficiency of sparging. Whereas in the conventional process, the liquid remaining in the spent grains still has about 1° Balling (° Balling is a measure of dissolved solids in solutions and is defined as percent by weight of solids at 60° F.), a residue of only 0.3° Balling remains in the same time period by the use of the process of this invention. Extract is a measure of extracted solids and is based on the density of sucrose solutions at 20° C.

In preparing the wort according to the process of the invention, a malt mash is prepared by adding malt flour to water to make a slurry. The proportion of flour to water may be varied widely as is well known to those skilled in the art.

In one example of preparing 100 barrels of beer from wort prepared by the process of this invention, a cooker cash is prepared in the customary brewing manner using refined corn grits or some other suitable source of starch and finely ground malt flour (100 mesh). The cooker mash contains about 1200 pounds of grits, about 125 pounds of malt flour and about 15 barrels of water which is agitated to produce a thoroughly wet slurry. This mash is then heated to about 120° F. in about 30 minutes and then boiled for about 15 minutes.

A malt mash is prepared from a finely ground malt flour that will pass a 100 mesh screen. The malt mash contains 2700 pounds of malt and about 22 barrels of water. Since it is desirable that the malt flour be wetted uniformly, the water and flour are blended through a commercially available mixer into the reaction vessel. The blending takes place at a temperature of about 120° F. After blending, the mash is held at this temperature for about 10 minutes for proteolysis after which the cooker mash is added and the temperature of the combined mash is raised to 160 to 163° F. where it is held for 15 minutes for starch conversion. The temperature is then raised rapidly to boiling and the mash is boiled one-quarter to one hour. The mash is then filtered and sparged with about 75 barrels of hot water.

Hops at a rate of about 0.35 pound per barrel of beer may be added during the boiling of the mash, or a hop extract may be used. If the boiled wort is filtered before adding hops, it can be reboiled with hops for one-quarter to one-half hour. In either case, the hopped wort is then cooled and fermented to produce beer. On the other hand, if hops are not added, the boiled wort may be used to produce malt extract and malt liquor.

The foregoing detailed description has been given for clearness and understanding only, and no unnecessary limitations should be understood therefrom, for some modifications will be obvious to those skilled in the art.

I claim:

1. A process for producing a boiled malt wort adapted for use in making beer, malt liquor or malt extract, comprising the steps of: preparing a malt mash using a finely ground malt flour capable of passing through a 60 mesh screen, adding an adjunct mash, boiling said mixed mashes, said boiling taking place without any prior filtration; and separating the liquid and extractable solids from the grain residual by suitable means.

2. A process for producing a boiled malt wort adapted for use in making beer, malt liquor or malt extract, comprising the steps of: preparing an adjunct mash containing starch, preparing a malt mash using a finely ground malt flour, said flour being fine enough to pass through a 100 mesh screen, adding said adjunct mash, heating the mixed mashes at a temperature less than their boiling temperature to convert said starch, thereafter boiling said mash mixture, said boiling taking place without any prior filtration; and separating the liquid and extractable solids from the grain residual by suitable means.

3. A process for producing a boiled malt wort adapted for use in making beer, malt liquor or malt extract in a single vessel without intermediate filtering, comprising the steps of: preparing a malt mash using a finely ground malt flour, said flour being fine enough to pass through a 100 mesh screen, adding an adjunct mash containing starch, heating the mixed mashes at from about 160 to 163° F. for about 15 minutes, thereafter boiling said mash mixture for from about one-quarter to one hour, said boiling taking place without any prior filtration; and separating the liquid and extractable solids from the grain residual by suitable means.

4. A process for producing a boiled malt wort adapted for use in making beer, malt liquor or malt extract, comprising the steps of: preparing an adjunct mash containing starch, preparing a malt mash using a finely ground malt flour, said flour being fine enough so that complete conversion takes place and substantially no starch is liberated on boiling, adding said adjunct mash, heating the mixed mashes at a temperature less than their boiling temperature to convert said starch, thereafter boiling said mash mixture, said boiling taking place without any prior filtration; and separating the liquid and extractable solids from the grain residual by suitable means.

5. A process for producing a boiled malt wort adapted for use in making beer, malt liquor or malt extract in a single vessel without intermediate filtering, comprising the steps of: preparing a malt mash using a finely ground malt flour, said flour being fine enough so that complete conversion takes place and substantially no starch is liberated on boiling, adding an adjunct mash containing starch, heating the mixed mashes at from about 160 to 163° F. for about 15 minutes, thereafter boiling said mash mixture for from about one-quarter to one hour, said boiling taking place without any prior filtration; and separating the liquid and extractable solids from the grain residual by suitable means.

References Cited in the file of this patent

UNITED STATES PATENTS

| 2,082,222 | Siebel | June 1, 1937 |
| 2,414,669 | Reich | Jan. 21, 1947 |
| 2,442,806 | Gluck | June 8, 1948 |